(12) United States Patent
Torimoto et al.

(10) Patent No.: US 9,112,286 B2
(45) Date of Patent: Aug. 18, 2015

(54) ULTRASONIC WELDING METHOD FOR CONDUCTORS

(75) Inventors: Yukihiro Torimoto, Shiga (JP); Shizuka Yamaguchi, Shiga (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 411 days.

(21) Appl. No.: 13/635,292

(22) PCT Filed: Mar. 15, 2011

(86) PCT No.: PCT/JP2011/001504
§ 371 (c)(1),
(2), (4) Date: Sep. 14, 2012

(87) PCT Pub. No.: WO2011/114710
PCT Pub. Date: Sep. 22, 2011

(65) Prior Publication Data
US 2013/0000949 A1    Jan. 3, 2013

(51) Int. Cl.
*B23K 20/10* (2006.01)
*H01R 4/02* (2006.01)
*H01R 43/02* (2006.01)

(52) U.S. Cl.
CPC ............... *H01R 4/021* (2013.01); *B23K 20/10* (2013.01); *B23K 20/106* (2013.01); *H01R 43/0207* (2013.01)

(58) Field of Classification Search
CPC ... B23K 20/10; Y10T 29/49194; H01B 13/00
See application file for complete search history.

(56) References Cited

U.S. PATENT DOCUMENTS

| 2004/0088857 | A1* | 5/2004 | Fujimoto et al. ................. 29/871 |
| 2006/0283912 | A1* | 12/2006 | Eberach .......................... 228/101 |
| 2007/0257088 | A1* | 11/2007 | Steiner et al. ............... 228/110.1 |
| 2011/0042444 | A1* | 2/2011 | Ohnuma .................... 228/110.1 |

FOREIGN PATENT DOCUMENTS

| JP | 2000-188018 | 7/2000 | |
| JP | 2004-095293 | 3/2004 | |
| JP | 2005-322544 | 11/2005 | |
| JP | 2007-149421 | 6/2007 | |
| JP | 2007-185706 | 7/2007 | |
| JP | 2008-507408 | 3/2008 | |
| WO | WO 2010026173 A1 * | 3/2010 | ............. B23K 20/10 |
| WO | WO 2011126115 A1 * | 10/2011 | |

OTHER PUBLICATIONS

International Search Report for PCT/JP2011/001504, mailed Apr. 19, 2011, 8 pages.

* cited by examiner

*Primary Examiner* — Devang R Patel
*Assistant Examiner* — Carlos Gamino
(74) *Attorney, Agent, or Firm* — Amin, Turocy & Watson, LLP

(57) ABSTRACT

An ultrasonic welding method for conductors is provided that is capable of suppressing occurrence of insufficient weld strength and a separation which may occur when terminals of a wires are ultrasonically welded. In a wire arranging step, wires are arranged in accordance with a predetermined arrangement. In a conductor moving step, conductors (2) are pressed in a predetermined direction by a grinding jaw (12), and thereby relative positions among the conductors (2) are changed. In a first ultrasonic welding step, ultrasonic welding is performed on the conductors (2) in a state of being pressed by the grinding jaw (12). In a second ultrasonic welding step, the pressing applied by the grinding jaw (12) is released, and ultrasonic welding is performed on the conductors (2).

8 Claims, 9 Drawing Sheets

ULTRASONIC WELDING METHOD FOR CONDUCTORS

CROSS-REFERENCE TO RELATED APPLICATIONS

This application is a U.S. National Stage of PCT Patent Application No. PCT/JP2011/001504, filed Mar. 15, 2011 and entitled "ULTRASONIC WELDING METHOD AND WELDING SECTION"; which claims priority to Japanese Patent Application No. 2010-061047, filed Mar. 17, 2010 and entitled "ULTRASONIC WELDING METHOD, AND WELDING SECTION". The entireties of the above-referenced applications are incorporated herein by reference.

TECHNICAL FIELD

The present invention relates primarily to a method for welding conductors of a plurality of wires to each other by means of ultrasonic welding.

BACKGROUND ART

For electrically connecting conductors of a plurality of wires to each other, for example, a method is adopted in which insulating coatings are removed to expose conductors and the exposed conductors are soldered to each other or the conductors are twisted and plied together by manual labor or the like. Particularly in recent years, a method in which the conductors are welded to each other by ultrasonic welding has been widely adopted, because an operation can be easily and surely performed (for example, Patent Document 1).

Meanwhile, Patent Document 2 points out that performing the ultrasonic welding by the method disclosed in the Patent Document 1 causes a problem in connection strength which may separate conductors from each other. As a connection method for solving this problem, the Patent Document 2 discloses a connection method in which exposed conductors are twisted together in the same direction and this twisted portion is welded by ultrasonic welding.

Patent Document 1: Japanese Patent Application Laid-Open No. 2000-188018
Patent Document 2: Japanese Patent Application Laid-Open No. 2005-322544

DISCLOSURE OF THE INVENTION

Problems to be Solved by the Invention

However, the connection method of the Patent Document 2 requires a step of twisting conductors, and therefore involves the following problems. That is, in a case where an operation of twisting a plurality of conductors in the same direction is performed by manual labor, there is a possibility that the twisting step is accidentally skipped and, in this condition, welding is performed in a subsequent welding step. Moreover, in a case where the twisting step is performed by manual labor, it is troublesome and costly. Although a configuration is conceivable in which the twisting step is performed by an apparatus, such an apparatus is complicated and therefore the cost increases.

Furthermore, if the twisting step is performed by manual labor, a foreign substance such as sebum of hands and a hand cream may adhere to the conductor. If the twisting step is a process performed by an apparatus, a foreign substance such as a rubber component and metal powder of a holder may adhere to the conductor. In the ultrasonic welding, a high-frequency vibration is given to a portion to be bonded, to thereby diffuse metal atoms and thus achieve bonding. Therefore, if a foreign substance exists between bonding surfaces, the diffusion of atoms is greatly hindered, which may cause a defective weld. In this manner, in a case where the ultrasonic welding is performed by the connection method of the Patent Document 2, there is a possibility that a foreign substance adheres to the conductor during the twisting step and a defective weld occurs in a welding portion.

The present invention is made in view of the circumstances described above, and an object of the present invention is to provide an ultrasonic welding method for conductors that is capable of suppressing occurrence of insufficient weld strength and a separation which may occur when terminals of a plurality of wires are ultrasonically welded.

Means for Solving the Problems and Effects Thereof

The problems to be solved by the present invention are as described above, and next, means for solving the problems and effects thereof will be described.

A first aspect of the present invention provides the following ultrasonic welding method. That is, the ultrasonic welding method is an ultrasonic welding method of connecting conductors of a plurality of wires to one another, the conductors being exposed by partially removing insulating coatings, the method including a wire arranging step, a conductor moving step, a first ultrasonic welding step, and a second ultrasonic welding step. In the wire arranging step, the plurality of wires are arranged in accordance with a predetermined arrangement. In the conductor moving step, the conductors are pressed in a predetermined direction and thereby relative positions of the conductors are changed. In the first ultrasonic welding step, ultrasonic welding is performed on the conductors in a state of being pressed in the predetermined direction. In the second ultrasonic welding step, the pressing in the predetermined direction is released and ultrasonic welding is performed on the conductors.

In a case where the conductors are pressed and the relative positions thereof are changed in this manner, when a pressing force is released, the conductors tend to return to their original positions due to a resilient force. That is, the relative positions among the conductors are different between when the conductors are pressed and when the pressing is released. Accordingly, the ultrasonic welding on the conductors can be performed while differentiating their positional relationship in the first ultrasonic welding step performed when the conductors are pressed and in the second ultrasonic welding step performed when the pressing is released. Thereby, the first ultrasonic welding step and the second ultrasonic welding step can make the connection in different directions. This can prevent a separation of the conductors. Additionally, since the relative positions of the conductors can be changed only by pressing the conductors, it is performed more easily at a lower cost as compared with, for example, a configuration in which the conductors are twisted by manual labor or a special apparatus, and moreover accidentally skipping the twisting can be prevented. Furthermore, it is not necessary that an operator touches the conductors with his/her hand or the conductors are gripped by a special apparatus, adhering of a foreign substance to the conductors can be prevented.

The ultrasonic welding method mentioned above is preferably performed as follows. That is, in the conductor moving step, the conductors are pressed and thereby the conductors are arranged side by side in a direction orthogonal to a direction of the pressing. In the first ultrasonic welding step, the ultrasonic welding is performed in a direction in which the conductors are arranged side by side.

In this manner, by pressing the conductors in a predetermined direction, the conductors can be arranged side by side in the direction orthogonal to the predetermined direction. Additionally, by performing the ultrasonic welding in the direction in which the conductors are arranged side by side, the welded portion obtained as a result of the first ultrasonic welding step is formed with an elongated shape. Such an elongated welded portion is particularly preferable because deformation is likely to occur when the pressing force in the predetermined direction is released.

In the ultrasonic welding method mentioned above, it is preferable that, in the wire arranging step, a plurality of the wires are arranged side by side in a direction in which the pressing is to be applied.

In a case where the plurality of wires are arranged side by side in the predetermined direction in this manner, the relative positions among the conductors can be easily changed when the conductors are pressed in the predetermined direction.

The ultrasonic welding method mentioned above is preferably performed as follows. That is, the ultrasonic welding method includes a second conductor moving step of releasing the pressing of the conductors in the predetermined direction and then pressing the conductors in a different direction to thereby change relative positions of conductors. In the second ultrasonic welding step, ultrasonic welding is performed on the conductors in a state of being pressed in the different direction.

By, in this manner, releasing the pressing applied in the predetermined direction and then pressing the conductors in the different direction, the conductors can be largely deformed. Thereby, the positional relationship of the conductors in the first ultrasonic welding step and that in the second ultrasonic welding step are made largely different from each other. As a result, the welded portion that is less likely to cause a separation can be formed.

A second aspect of the present invention provides a welded portion in which conductors of a plurality of wires are connected to one another by ultrasonic welding, the conductors being exposed by partially removing insulating coatings, the welded portion being formed as follows. That is, the conductors include a plurality of strands. Each of the strands is connected to strands adjacent thereto in a plurality of directions.

By, in this manner, connecting the strands to one another in a plurality of directions, a welded portion less likely to cause a separation can be formed by ultrasonic welding.

Figure 1:
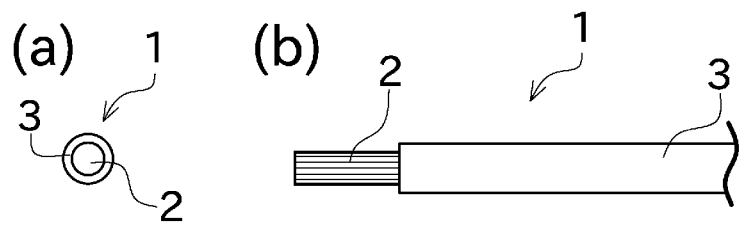
FIG. 1 A diagram showing a configuration of a wire that is a processing object of an ultrasonic welding method according to the present invention.

DESCRIPTION OF REFERENCE NUMERALS 1 wire
2 conductor
3 insulating coating
10 ultrasonic welder
11 sonotrode
12 grinding jaw
13 anvil plate
14 anvil
21 welded portion

BEST MODE FOR CARRYING OUT THE INVENTION

Next, an embodiment of the present invention will be described with reference to the drawings. Firstly, with reference to FIG. 1, a description will be given to a wire that is a welding object of an ultrasonic welding method of the present invention. FIG. 1(a) shows a wire 1 when viewed in a longitudinal direction thereof, and FIG. 1(b) is a side view of the wire 1. The wire 1 has a conductor 2 covered with an insulating coating 3. FIG. 1 shows a state where the insulating coating 3 at an end portion of the wire 1 is removed. In this manner, by stripping off the insulating coating 3 of the wire 1, the conductor 2 located inside can be exposed.

Though not shown in FIG. 1, the conductor 2 is a bundle of a plurality of thin metallic strands. Within the insulating coating 3, each of the strands has its shape constrained by the insulating coating 3. However, within the insulating coating 3, the strands are movable to some extent relative to one another. In the portion (the left end portion in FIG. 1(b)) where the insulating coating 3 is removed, the relative movement of the strands can more readily occur because the shape constraint is not applied by the insulating coating 3. Therefore, by applying an external force to the portion of the conductor 2 where the insulating coating 3 is removed, a shape (the shape shown in FIG. 1(a)) of the conductor 2 when viewed in a longitudinal direction of the wire 1 can be deformed to some extent.

As described above, if the insulating coating 3 is removed, the strands are readily moved relative to one another. Thus, there is a problem that a separation between the strands easily occurs in a case where merely normal ultrasonic welding is performed on the portion where the insulating coating 3 is removed. This point will be briefly described with reference to FIG. 2.

Figure 2:
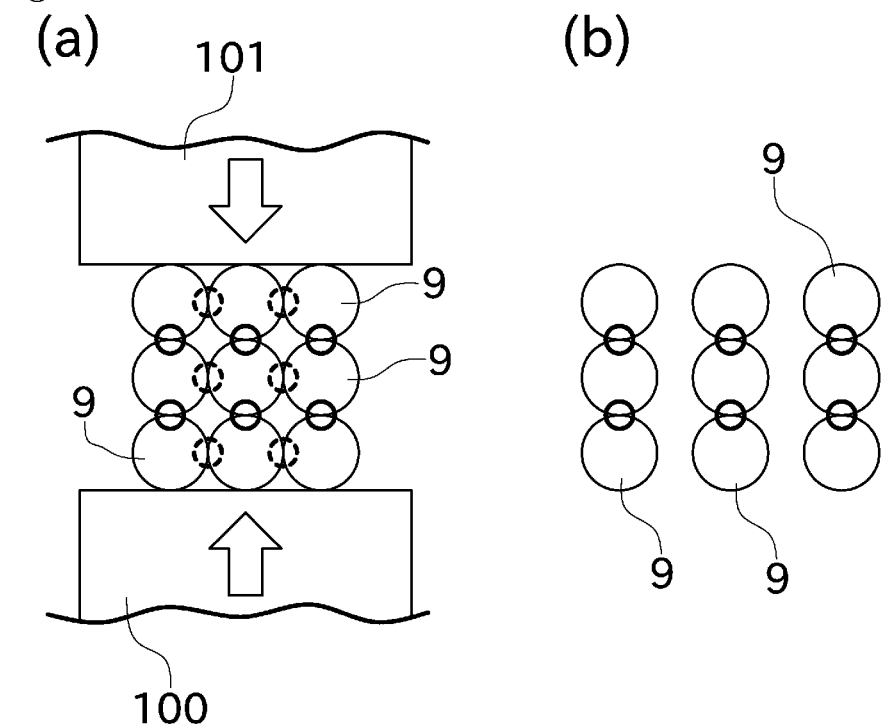
FIG. 2 A diagram for explaining problems of a conventional ultrasonic welding method.

FIG. 2 is a schematic diagram for explaining the principle of ordinary ultrasonic welding. In the ordinary ultrasonic welding, firstly, a sonotrode 100 and an anvil 101 sandwich strands 9 therebetween, and the strands 9 are pressed in a direction indicated by the arrows in the drawing. Then, by means of an ultrasonic oscillator which is not shown, the sonotrode 100 is vibrated in a direction perpendicular to the drawing sheet of FIG. 2. On the other hand, the anvil 101 is not vibrated. This causes the strands 9 adjacent to each other in the pressing direction to be moved relative to each other. As a result, frictions occur in portions (portions enclosed by the circles of thick solid lines in FIG. 2) where the strands 9 are in contact with each other in the pressing direction, so that oxide films, or the like, of metal surfaces are removed and additionally contact surfaces are smoothed. Then, the contact surfaces from which the oxide films, or the like, have been removed are repeatedly moved back and forth relative to each other. Consequently, diffusion of atoms occur between the contact surfaces, to cause recrystallization of the metal. Thus, mechanical and electrical bonding is completed.

On the other hand, in portions (portions enclosed by the circles of thick dotted lines in FIG. 2) where the strands 9 are in contact with each other in a direction orthogonal to the pressing direction, the strands 9 are hardly moved relative to each other. Accordingly, in the portions enclosed by the circles of dotted lines in FIG. 2, removal of oxide films, and the like, and diffusion of atoms are not likely to occur, and thus there is a tendency that connection strength is low between the strands 9 adjacent to each other in the direction orthogonal to the pressing direction. Therefore, there has been a problem that, in a case where the ultrasonic welding is performed only in a single direction as shown in FIG. 1(a), the strands are readily separated as shown in FIG. 2(b).

Figure 3:
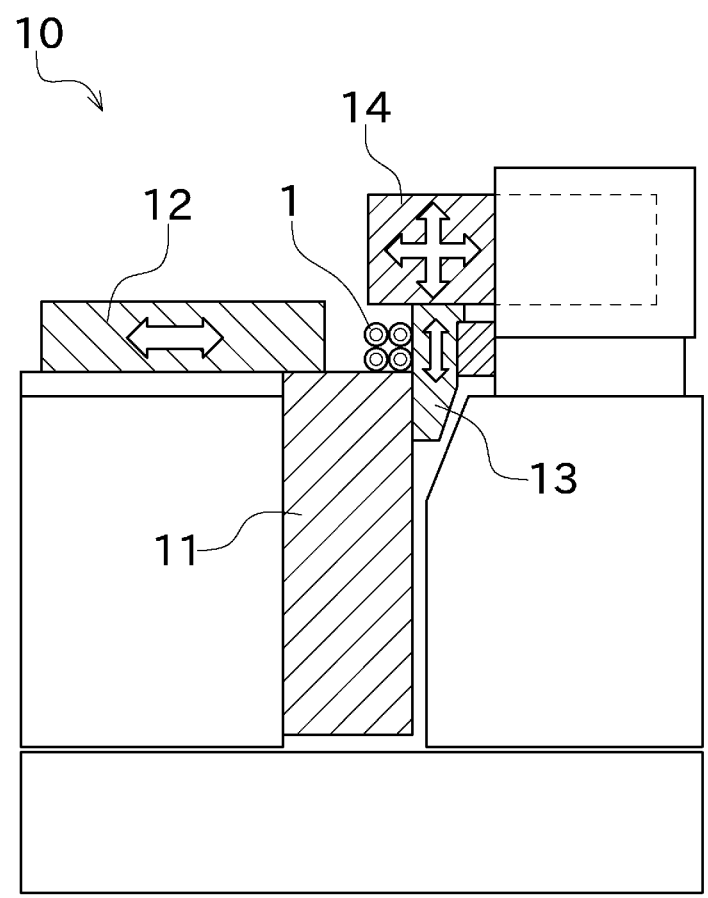
FIG. 3 A front elevational view of an ultrasonic welder.

Next, an ultrasonic welder used in the ultrasonic welding method of the present invention will be described with reference to FIG. 3. As shown in FIG. 3, this ultrasonic welder 10 includes a sonotrode 11, a grinding jaw 12, an anvil plate 13, and an anvil 14.

The sonotrode 11 is configured to cause ultrasonic oscillation by an ultrasonic oscillator which is not shown. More specifically, the sonotrode 11 vibrates in a direction perpendicular to the drawing sheet of FIG. 3. An upper surface of the sonotrode 11 has a planar shape, and a plurality of wires 1 can be arranged and placed on the upper surface. Hereinafter, the upper surface of the sonotrode 11 will be referred to as "placement surface". FIG. 3 shows the ultrasonic welder 10 when viewed in a longitudinal direction of the wires 1 placed on the placement surface.

The anvil plate 13 is arranged lateral to the wires 1 placed on the placement surface. The anvil plate 13 is movable in a direction (in the vertical direction in FIG. 3) orthogonal to the placement surface. Since the anvil plate 13 is movable up and down, interference with the anvil 14 (which will be described later) that is similarly movable up and down can be avoided.

The grinding jaw 12 is arranged at the side opposite to the anvil plate 13 across the wires 1 placed on the placement surface. The grinding jaw 12 is movable in a direction (in the lateral direction in FIG. 3) parallel to the placement surface and orthogonal to the longitudinal direction of the wires 1. In other words, the grinding jaw 12 is movable in a direction toward and away from the anvil plate 13. In the above-described configuration, the grinding jaw 12 is moved toward the anvil plate 13, and thereby the conductors 2 of the plurality of wires 1 placed on the placement surface can be sandwiched between the grinding jaw 12 and the anvil plate 13.

The anvil 14 is arranged above the sonotrode 11 and the anvil plate 13. The anvil 14 is movable in a plane orthogonal to the longitudinal direction of the wires 1 placed on the placement surface (that is, movable in the vertical and lateral directions in FIG. 3). A lower surface (a surface opposed to the placement surface) of the anvil 14 extends substantially in parallel with the placement surface, and has a substantially planar shape. By moving the anvil 14 downward (in a direction toward the sonotrode 11), the conductors of the plurality of wires 1 placed on the placement surface can be pressed between the anvil 14 and the sonotrode 11. By moving the anvil 14 in the lateral direction in FIG. 3, interference with the grinding jaw 12 that is similarly movable in the lateral direction can be avoided.

Next, a conventional ultrasonic welding method using the ultrasonic welder 10 having the above-described configuration will be described as follows.

Firstly, a wire terminal processing step is performed. That is, as shown in FIG. 1(b), in an end portion of each of a plurality of wires 1 to be connected, a predetermined length of the insulating coating 3 is stripped, to expose the conductor 2 arranged inside.

Figure 4:
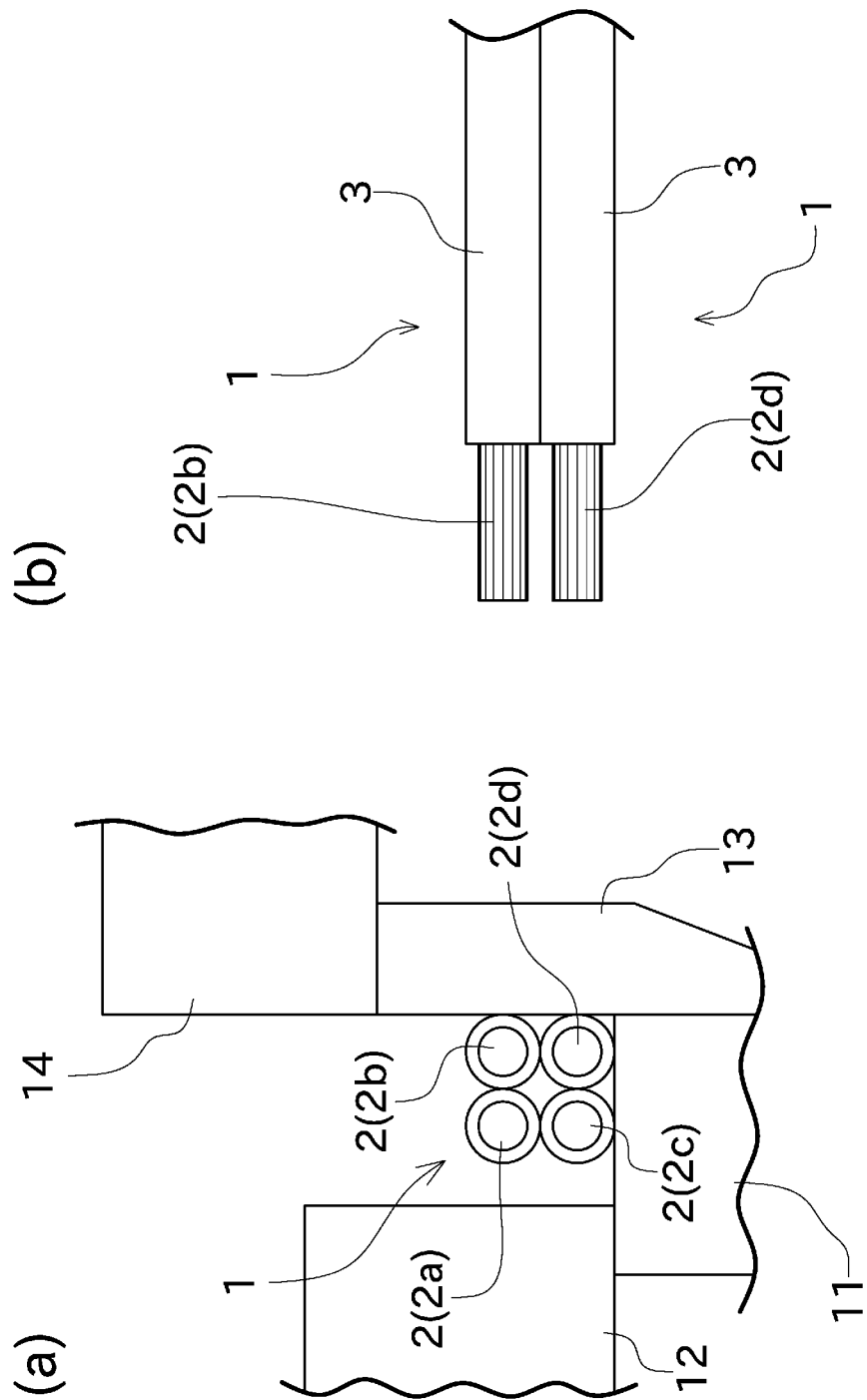
FIG. 4 A diagram for explaining a wire arranging step.

Then, a wire arranging step is performed in which the plurality of wires 1 are set on the upper surface (placement surface) of the sonotrode 11. FIG. 4(a) is a schematic diagram showing the wires 1 set on the placement surface when viewed in the longitudinal direction of the wires 1. FIG. 4(b) is a side view of the wires 1 shown in FIG. 4(a). As shown in FIG. 4, in this example, four wires 1 are arranged with two in the lateral direction and two in the vertical direction. More specifically, the wire 1 having a conductor 2c and the wire 1 having a conductor 2d are set side by side in the lateral direction, and the wire 1 having a conductor 2a is set on the wire 1 having the conductor 2c, and the wire 1 having a conductor 2b is set on the wire 1 having the conductor 2d. It is configured such that a space between the grinding jaw 12 and the anvil plate 13 is openable to a sufficient width in order that at least two conductors 2 can be arranged side by side in the lateral direction. It is also configured such that a space between the sonotrode 11 and the anvil 14 is openable to a sufficient width in order that at least two conductors 2 can be stacked in the vertical direction.

Figure 5:
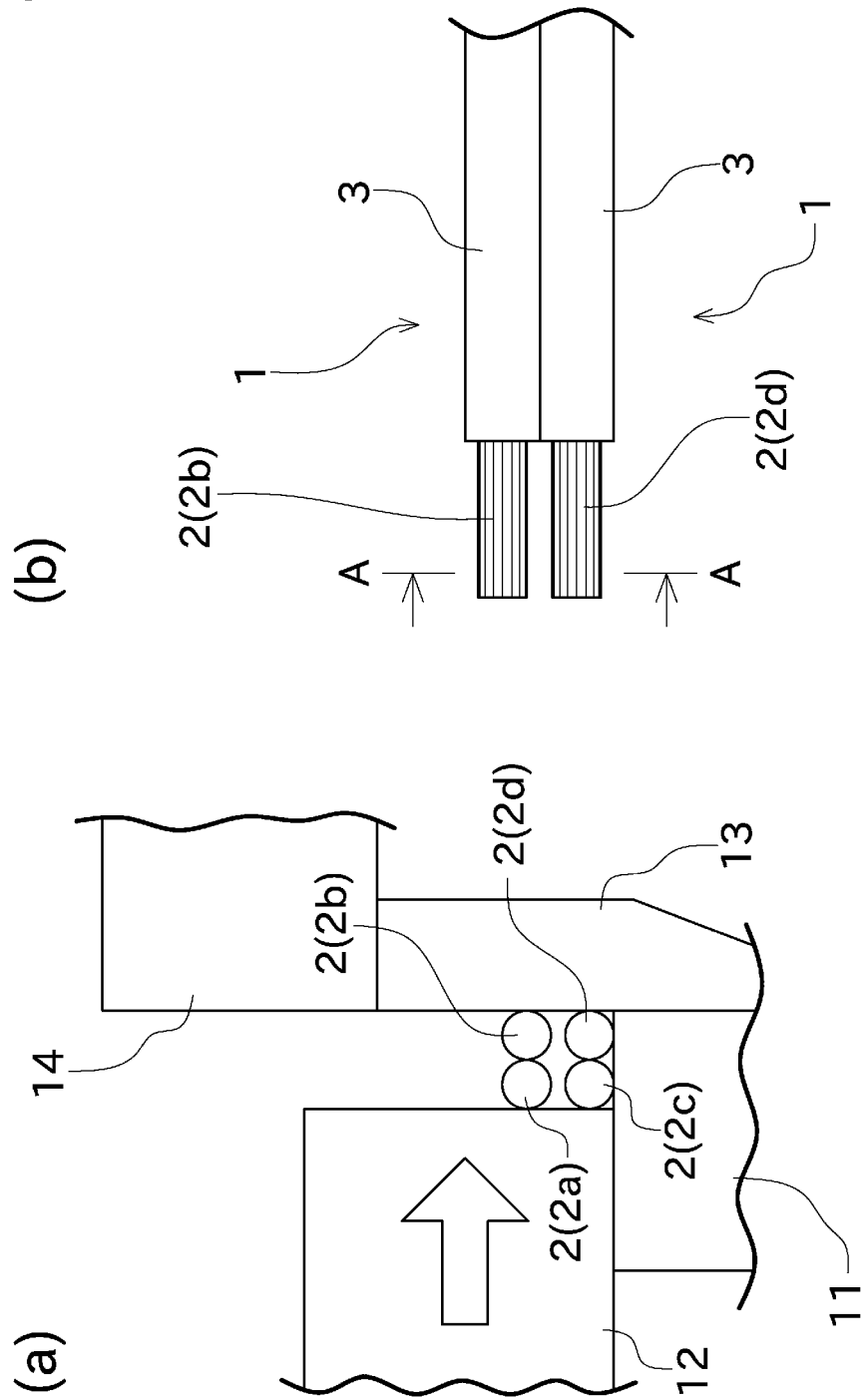
FIG. 5 A diagram for explaining a situation where a grinding jaw has been moved.

Then, a conductor sandwiching step for sandwiching the conductors 2a, 2b, 2c, and 2d from left and right sides thereof is performed. That is, the grinding jaw 12 is moved in the direction toward the anvil plate 13, to bring them close to each other to such an extent that the interval between the grinding jaw 12 and the anvil plate 13 corresponds to about two conductors 2. In this manner, the conductors 2a, 2b, 2c, and 2d are sandwiched by the grinding jaw 12 and the anvil plate 13. This situation is shown in FIG. 5. In FIG. 5(a), for better illustration of a state of the conductors 2, the wires 1 are shown in a cross-sectional view taken along the line A-A indicated by the arrows in FIG. 5(b). In the other drawings of the same type (FIG. 6(a), FIG. 7(a), FIG. 8(a), FIG. 9(a), and FIG. 10), similarly, the wires 1 are shown in a cross-sectional view taken along the line indicated by the arrows. As described above, the conductors 2a, 2b, 2c, and 2d are sandwiched by the grinding jaw 12 and the anvil plate 13, and thereby a movement of the conductors 2a, 2b, 2c, and 2d in a horizontal direction (in the lateral direction in FIG. 5(a)) is restricted.

Figure 6:
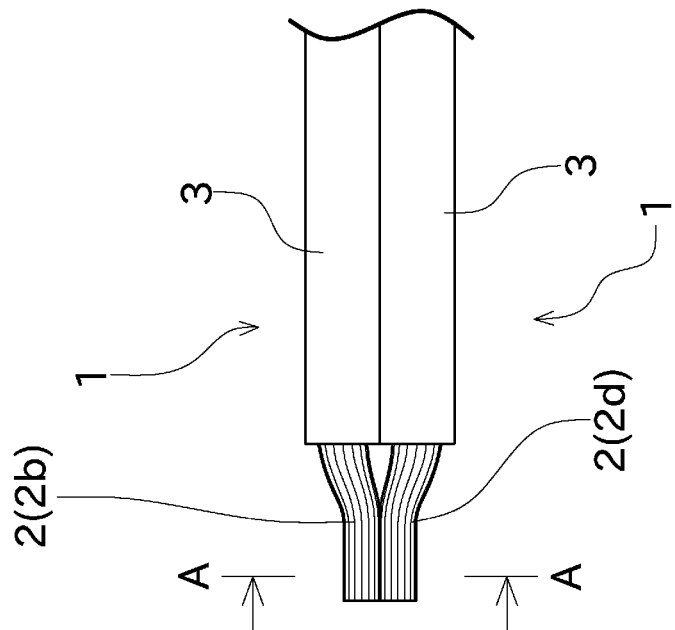
FIG. 6 A diagram for explaining an ultrasonic welding step in the conventional ultrasonic welding method.
Figure 6:
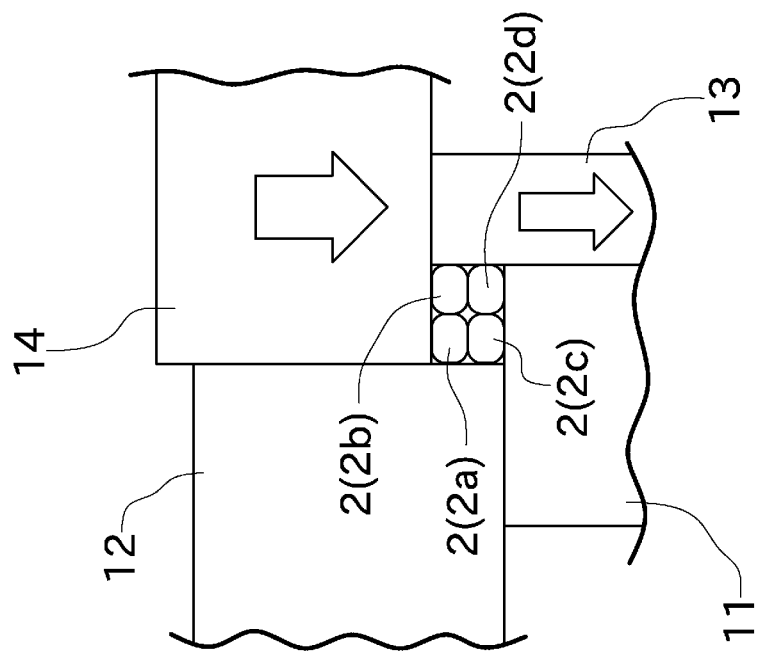

Then, a conductor pressing step for pressing the conductors 2a, 2b, 2c, and 2d in the vertical direction is performed. That is, firstly, the anvil 14 is moved to cover the conductors 2a, 2b, 2c, and 2d from above with a part of the anvil 14. In FIG. 5(a), the anvil 14 is moved to the left (in the direction toward the grinding jaw 12). Then, the anvil 14 and the anvil plate 13 are moved to sandwich the conductors 2a, 2b, 2c, and 2d of the wires 1 between the sonotrode 11 and the anvil 14. This situation is shown in FIG. 6. In FIG. 6(a), the anvil 14 and the anvil plate 13 are moved downward in the drawing (in the direction bringing the anvil 14 close to the sonotrode 11). At this time, the amount of movement of the anvil 14 is appropriately adjusted such that a suitable pressure for performing ultrasonic welding which will be described later is applied to the conductors 2a, 2b, 2c, and 2d.

Finally, an ultrasonic welding step for performing welding by giving an ultrasonic vibration to the conductors 2a, 2b, 2c, and 2d is performed. That is, while the sonotrode 11 and the anvil 14 are pressing the conductors 2, the sonotrode 11 is ultrasonically vibrated. As a result, the conductors 2a, 2b, 2c, and 2d are welded.

In such a conventional ultrasonic welding method, the ultrasonic welding is performed only in a single direction. Therefore, as described above, there is a disadvantage that a separation between strands easily occurs. In this respect, to overcome the disadvantage mentioned above, the Patent Document 2 discloses a method in which the ultrasonic welding is performed after the conductors 2 are twisted. However, as described above, the problems of increased troubles and costs, a connection failure due to entry of a foreign substance, and the like, may occur.

Next, a description will be given to the ultrasonic welding method of this embodiment in which the problems of the conventional method described above have been solved. This ultrasonic welding method includes a wire terminal processing step, a wire arranging step, a conductor moving step, a first conductor pressing step, a first ultrasonic welding step, a second conductor pressing step, and a second ultrasonic welding step.

In this ultrasonic welding method, the wire terminal processing step and the wire arranging step are performed in the same manner as in the conventional ultrasonic welding method described above. Therefore, descriptions of details of these steps are omitted.

Then, the conductor moving step is performed. Firstly, similarly to the conductor sandwiching step of the conventional method described above, the grinding jaw 12 is moved in the direction toward the anvil plate 13, to sandwich the conductors 2a, 2b, 2c, and 2d therebetween. Here, in the conductor sandwiching step of the conventional method described above, the interval between the grinding jaw 12 and the anvil plate 13 corresponds to about two conductors 2 (the state shown in FIG. 5(a)). However, in the conductor moving step of this embodiment, the grinding jaw 12 in the state shown in FIG. 5(a) is further moved.

Figure 7:
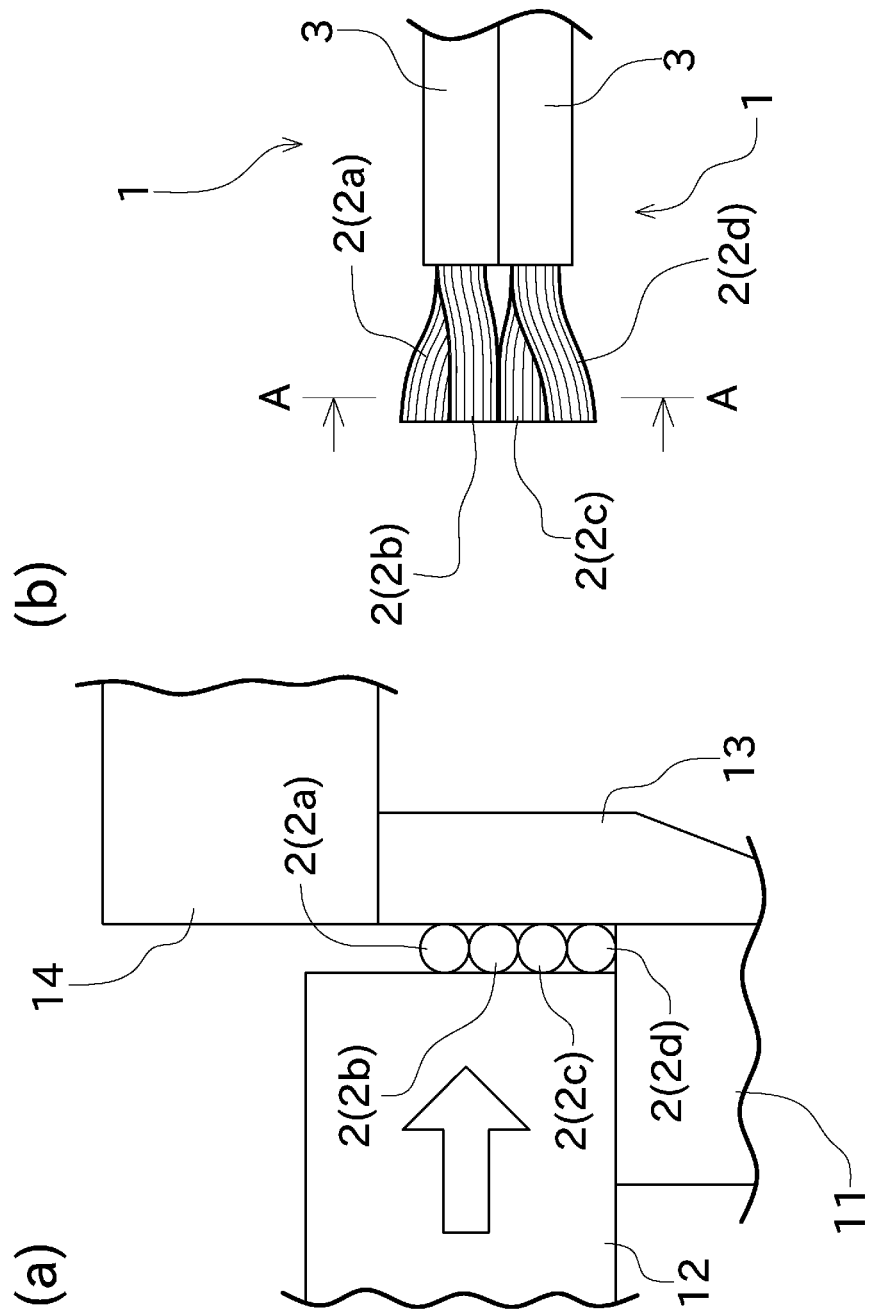
FIG. 7 A diagram for explaining a conductor moving step.

Thus, the grinding jaw 12 in the state shown in FIG. 5(a) is further moved in the direction toward the anvil plate 13 (to the right in FIG. 5(a)), and thereby the grinding jaw 12 presses the conductors 2a and 2c in the direction moving them to the right in FIG. 5(a). Here, as shown in FIG. 5(a), the conductor 2a and the conductor 2b placed on the placement surface are arranged side by side in a direction of pressing applied by the grinding jaw 12. Likewise, the conductor 2c and the conductor 2d are also arranged side by side in the direction of pressing applied by the grinding jaw 12. Since the conductors 2 are arranged side by side in the direction of pressing applied by the grinding jaw 12 in this manner, pressing the conductors 2 by the grinding jaw 12 allows the conductors 2 to be moved relative to one another. For example, if the conductors 2 in the state shown in FIG. 5(a) are pressed by the grinding jaw 12, the conductor 2a is pushed out above the conductor 2b, and the conductor 2c is pushed in between the conductor 2b and the conductor 2d. In this case, as shown in FIG. 7, the conductors 2a, 2b, 2c, and 2d are arranged in this order from the top. Here, this relative movement occurs only in the distal end portions of the conductors 2, and little or no relative movement occurs in portions having the insulating coatings 3. That is, even after the conductor moving step, the portions of the wire 1 having the insulating coatings 3 maintain the arrangement (two in the vertical direction and two in the horizontal direction) set in the wire arranging step.

Then, the first conductor pressing step is performed. This first conductor pressing step is equivalent to the conductor pressing step of the conventional method described above. To be specific, firstly, the anvil 14 is moved to cover the conductors 2a, 2b, 2c, and 2d from above with a part of the anvil 14. Then, the anvil 14 and the anvil plate 13 are moved to sandwich the conductors 2a, 2b, 2c, and 2d of the wires 1 between the sonotrode 11 and the anvil 14. At this time, the amount of movement of the anvil 14 is appropriately adjusted such that a suitable pressure for performing first ultrasonic welding which will be described later is applied to the conductors 2a, 2b, 2c, and 2d.

In this state, the first ultrasonic welding step is performed. To be specific, the sonotrode 11 causes ultrasonic oscillation, to ultrasonically weld the strands included in the conductors 2 to each other. Thereby, the strands adjacent to each other in the direction of pressing applied by the anvil 14 are connected to each other. A welded portion formed as a result of this first ultrasonic weld will be called a temporary welded portion 20. In FIG. 8(a), a direction in which the welding is performed in the temporary welded portion 20 is indicated by the thin solid lines. That is, the strands arranged side by side in these thin solid lines are firmly connected to each other, but the strands arranged side by side in a direction orthogonal to these thin solid lines are weakly connected to each other.

Figure 9:
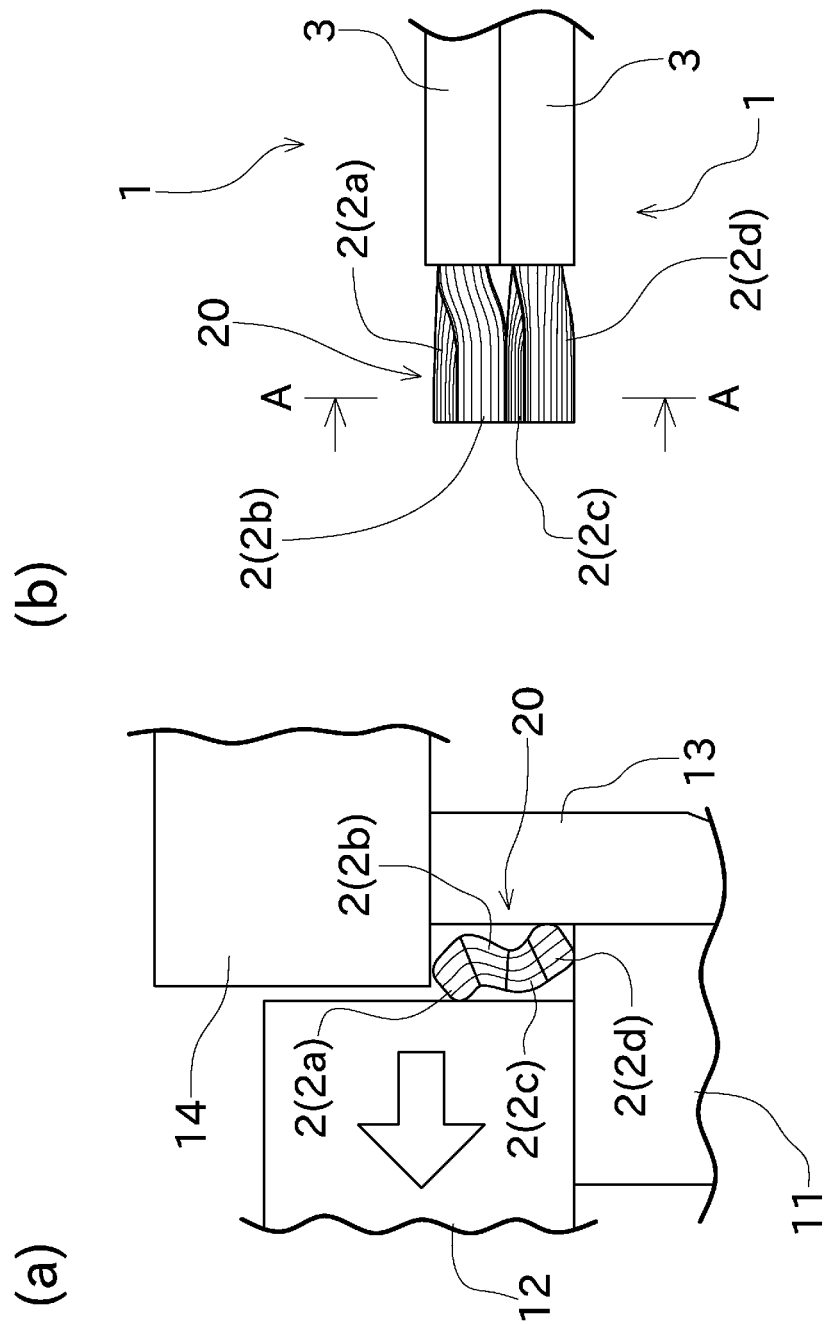
FIG. 9 A diagram for explaining a situation where a temporary welded portion is deformed.

Then, the pressing of the conductors 2 (temporary welded portion 20) applied by the grinding jaw 12 is released. This situation is shown in FIG. 9. That is, the grinding jaw 12 is moved in the direction away from the anvil plate 13 (to the left in FIG. 9(a)), and thereby the sandwiching of the conductors 2 (temporary welded portion 20) made by the grinding jaw 12 and the anvil plate 13 is released. Thus, a force restricting the conductors 2a, 2b, 2c, and 2d from moving in the lateral direction in FIG. 9(a) is released.

Here, as described above, the portions of the wires 1 having the insulating coatings 3 maintain the arrangement (two in the vertical direction and two in the horizontal direction) set in the wire arranging step. Accordingly, the conductors 2 pressed by the grinding jaw 12 and thereby forcibly moved is subjected to such a force that they are pulled by the insulating coatings 3 covering these conductors 2. If, in this state, the sandwiching of the conductors 2 (temporary welded portion 20) made by the grinding jaw 12 is released, the conductors 2a, 2b, 2c, and 2d receive a stress from the insulating coatings 3 and therefore tend to return to the same arrangement as that of the insulating coatings 3 (two in the vertical direction and two in the horizontal direction). Due to this force of the conductors 2a, 2b, 2c, and 2d returning to the original positions, the temporary welded portion 20 is deformed. More specifically, as shown in FIG. 9(a), the A-A cross-sectional shape of the temporary welded portion 20 is deformed into a substantially S-like shape.

Figure 8:
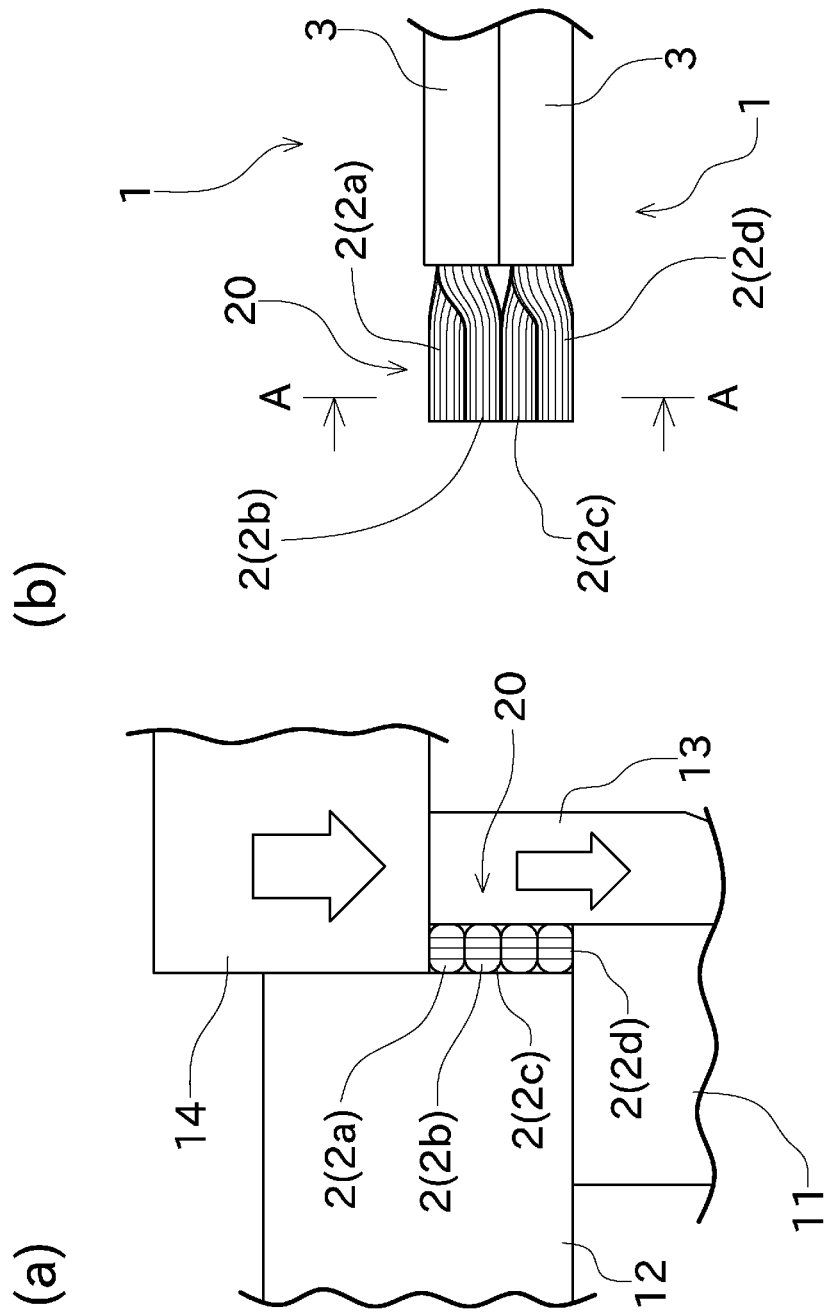
FIG. 8 A diagram for explaining a first ultrasonic welding step.

As shown in FIG. 8(a), the temporary welded portion 20 is elongated in the vertical direction. In other words, at a time point when the first ultrasonic welding step is performed, a space defined by the sonotrode 11, the grinding jaw 12, the anvil plate 13, and the anvil 14 has a rectangular shape elongated in the vertical direction, when viewed in the longitudinal direction of the wires 1. Here, it is considered that, if the temporary welded portion 20 is formed such that its A-A cross-sectional shape in FIG. 8 is a squatty shape, the temporary welded portion 20 is hard to deform. Therefore, in such a case, even though the pressing applied by the grinding jaw 12 is released, the temporary welded portion 20 would hardly deform. In this respect, in this embodiment, the conductors 2a, 2b, 2c, and 2d are arranged vertically in one line, and the ultrasonic welding is performed in the direction of this arrangement to thereby form the elongated temporary welded portion 20. As a result, the deformation of the temporary welded portion 20 is likely to occur when the pressing applied by the grinding jaw 12 is released.

Then, the second conductor pressing step is performed. That is, in a state shown in FIG. 9, the anvil plate 13 is moved to cover the temporary welded portion 20 (conductors 2) from above. Then, the anvil 14 and the anvil plate 13 are moved to sandwich the temporary welded portion 20 (conductors 2)

between the sonotrode 11 and the anvil 14. At this time, the amount of movement of the anvil 14 is appropriately adjusted such that a suitable pressure for performing second ultrasonic welding which will be described later is applied to the temporary welded portion 20 (conductors 2).

Figure 10:
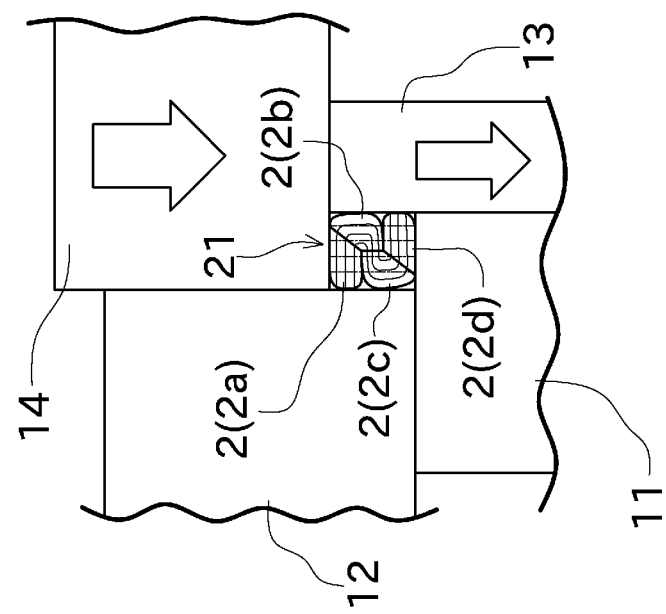
FIG. 10 A diagram for explaining a second ultrasonic welding step.

This situation is shown in FIG. 10. As shown in FIG. 10, in the state shown in FIG. 9, the conductors 2 are pressed by the anvil 14, and thereby the temporary welded portion 20 (conductors 2) are pushed into the space defined by the sonotrode 11, the grinding jaw 12, the anvil plate 13, and the anvil 14 while being deformed into an S-like shape.

This second conductor pressing step can also be called a second conductor moving step, because it is considered that the relative positions of the conductors 2a, 2b, 2c, and 2d are changed by deforming the temporary welded portion 20. In the second conductor pressing step (second conductor moving step), the conductors 2 are pressed in a direction different from that of the previous conductor moving step, and thus the conductors 2a, 2b, 2c, and 2d can be moved relative to one another in a direction different from that of the conductor moving step.

Finally, the second ultrasonic welding step is performed. That is, the sonotrode 11 causes ultrasonic oscillation, and thereby the temporary welded portion 20 is further ultrasonically welded, to eventually form a welded portion 21. In the welded portion 21 shown in FIG. 10, a direction in which the strands connected by this second ultrasonic welding step are arranged side by side is indicated by the thin alternate long and short dash lines.

As described above, at a time point when the second ultrasonic welding step is performed, the temporary welded portion 20 has been deformed from the state thereof at a time point when the first ultrasonic welding step is completed. Thus, at the time point when the second ultrasonic welding step is performed, the relative positions of the conductors 2a, 2b, 2c, and 2d have been changed from the relative positions established at the time point when the first ultrasonic welding step is performed. Therefore, by performing the second ultrasonic welding step, the strands can be connected to one another in a direction different from that of the first ultrasonic welding step. This can make it less likely to separate the strands of the welded portion 21 than the conventional configuration in which the ultrasonic welding is performed only in a single direction.

As described above, by performing the second ultrasonic welding step, eventually, the welded portion 21 can be formed in which one strand is ultrasonically welded to another adjacent strand in a plurality of directions.

In the ultrasonic welding method of this embodiment, the relative positions of the conductors 2a, 2b, 2c, and 2d are different between in the first ultrasonic welding step and in the second ultrasonic welding step, and therefore it is not necessary to twist the conductors 2 (temporary welded portion) by manual labor or to twist the conductors 2 by using a special apparatus. This can prevent a foreign substance from adhering to the conductors 2 at a time of changing the relative positions of the conductors 2a, 2b, 2c, and 2d.

As described above, the ultrasonic welding method of this embodiment is an ultrasonic welding method of connecting the conductors 2 of the plurality of wires 1 to one another, the conductors 2 being exposed by partially removing the insulating coatings 3, the method including the wire arranging step, the conductor moving step, the first ultrasonic welding step, and the second ultrasonic welding step. In the wire arranging step, a plurality of wires 1 are arranged in accordance with a predetermined arrangement. In the conductor moving step, the conductors 2 are pressed in a predetermined direction by the grinding jaw 12, and thereby the relative positions among the conductors 2 are changed. In the first ultrasonic welding step, the ultrasonic welding is performed on the conductors 2 in the state of being pressed by the grinding jaw 12. In the second ultrasonic welding step, the pressing applied by the grinding jaw 12 is released, and the ultrasonic welding is performed on the conductors 2.

In a case where the conductors 2 are pressed and the relative positions thereof are changed in this manner, when a pressing force is released, the conductors 2 tend to return to their original positions due to a resilient force. That is, the relative positions among the conductors 2 are different between when the conductors 2 are pressed and when the pressing is released. Accordingly, the ultrasonic welding on the conductors 2 can be performed while differentiating their positional relationship in the first ultrasonic welding step performed when the conductors 2 are pressed and in the second ultrasonic welding step performed when the pressing is released. Thereby, the first ultrasonic welding step and the second ultrasonic welding step can make the connection in different directions. This can prevent a separation of the strands of the conductors 2. Additionally, since the relative positions of the conductors 2 can be changed only by pressing the conductors 2, it is performed more easily at a lower cost as compared with, for example, a configuration in which the conductors 2 are twisted by manual labor or a special apparatus, and moreover accidentally skipping the twisting can be prevented. Furthermore, it is not necessary that an operator touches the conductors 2 with his/her hand or the conductors are gripped by a special apparatus, adhering of a foreign substance to the conductors 2 can be prevented.

The ultrasonic welding method of this embodiment is performed as follows. That is, in the conductor moving step, the grinding jaw 12 presses the conductors 2, and thereby the conductors 2 are arranged side by side in a direction orthogonal to the pressing direction. In the first ultrasonic welding step, the ultrasonic welding is performed in the direction in which the conductors 2 are arranged side by side.

In this manner, by pressing the conductors 2 in a predetermined direction, the conductors 2 can be arranged side by side in the direction orthogonal to the pressing direction. Additionally, by performing the ultrasonic welding in the direction in which the conductors 2 are arranged side by side, the welded portion obtained as a result of the first ultrasonic welding step is formed with an elongated shape. Such an elongated welded portion is particularly preferable because deformation is likely to occur when the pressing force is released.

In the ultrasonic welding method of this embodiment, in the wire arranging step, the plurality of wires 1 are arranged side by side in the direction of pressing to be applied by the grinding jaw 12.

In a case where the plurality of wires 1 are arranged side by side in the direction of pressing to be applied by the grinding jaw 12 in this manner, the relative positions among the conductors 2 can be easily changed when the conductors 2 are pressed in this pressing direction.

The ultrasonic welding method of this embodiment is performed as follows. That is, the ultrasonic welding method includes the second conductor pressing step of releasing the pressing of the conductors 2 applied by the grinding jaw 12 and then pressing the conductors 2 in a different direction by the anvil 14 to thereby change the relative positions among the conductors 2. Then, in the second ultrasonic welding step, the ultrasonic welding is performed on the conductors 2 in the state of being pressed in the different direction.

By, in this manner, releasing the pressing applied by the grinding jaw 12 and then pressing the conductors 2 in the different direction by the anvil 14, the conductors 2 can be largely deformed. Thereby, the positional relationship of the conductors 2 in the first ultrasonic welding step and that in the second ultrasonic welding step are made largely different from each other. As a result, the welded portion 21 that is less likely to cause a separation can be formed.

The welded portion 21 formed by the ultrasonic welding method of the present invention is a welded portion in which the conductors 2 of the plurality of wires 1 are connected to one another by ultrasonic welding, the conductors 2 being exposed by partially removing the insulating coatings 3, the welded portion 21 being formed as follows. That is, the conductors 2 include a plurality of strands, and each of the strands is connected to the strands adjacent thereto in a plurality of directions.

By, in this manner, connecting the strands to one another in a plurality of directions, a welded portion less likely to cause a separation can be formed by ultrasonic welding.

Although a preferred embodiment of the present invention has been described above, the above-described configuration may be modified, for example, as follows.

In the embodiment described above, in the wire arranging step, the wires 1 are arranged with two in the lateral direction and two in the vertical direction. However, this is not limiting. In the first place, the number of wires 1 is not limited to four. The method of the present invention is applicable as long as there are a plurality of wires 1.

In the embodiment described above, the temporary welded portion 20 is deformed into a substantially S-like shape. However, the temporary welded portion 20 is not necessarily deformed into such an S-like shape. The point is that, after the first ultrasonic welding step, the temporary welded portion 20 is deformed so that the ultrasonic welding in the second ultrasonic welding step is performed in a different direction.

In the embodiment described above, by the pressing applied by the grinding jaw 12, the conductor 2a, the conductor 2b, the conductor 2c, and the conductor 2d are arranged in this order. However, the conductors 2 are not necessarily arranged in this order. For example, it is possible that they are arranged in the order of the conductor 2b, the conductor 2a, the conductor 2c, and the conductor 2d. In this case, when the pressing applied by the grinding jaw 12 is released, the temporary welded portion 20 is not deformed in the above-described S-like shape, and is considered to be deformed into, for example, a substantially C-like shape. Thus, even if the order in which the conductors 2 are arranged is different, the temporary welded portion 20 is deformed when the pressing applied by the grinding jaw 12 is released, and therefore the same effects as those of the embodiment described above are exerted.

In the embodiment described above, an example in which the ultrasonic welding is performed in two stages has been illustrated. However, for example, in a case of three stages as well, the same effects are exerted. The point is that the ultrasonic welding is performed a plurality of times with changing the relative positions of the conductors 2.

In the embodiment described above, firstly the conductors 2 are pressed by the grinding jaw 12 and moved relative to one another, and then they are pressed by the anvil 14 so that the temporary welded portion 20 is deformed. However, this is not limiting. For example, it is acceptable that firstly the conductors 2 are pressed by the anvil 14 and moved relative to one another (a conductor moving step, a first conductor pressing step), and then the first ultrasonic welding step is performed. In this case, a temporary welded portion elongated in the lateral direction is formed. In a case where the conductor moving step is performed in this manner, the pressing applied by the anvil 14 is then released and pressing is applied by the grinding jaw 12 to thereby deform the temporary welded portion into an S-like shape (a second conductor moving step), and furthermore pressing is applied again by the anvil 14 (a second conductor pressing step) and then the second ultrasonic welding step is performed. In this manner, the second conductor moving step and the second conductor pressing step may be separate steps.

It is preferable that the temporary welded portion 20 has an elongated shape when viewed in the longitudinal direction of the wires 1, because the deformation in the second conductor moving step easily occurs. However, there is a limit to the distance by which the pressing applied by the grinding jaw 12 can move the conductors relative to one another. Considering the above-described points, the shape of the temporary welded portion 20 ideally has a height-to-width ratio of about 2:1 (or 1:2) when viewed in the longitudinal direction of the wires 1. However, this is not limiting, and a height-to-width ratio in a range of 5:1 to 1:1 (or 1:1 to 1:5) is favorable. Here, even though the shape of the temporary welded portion 20 has a height-to-width ratio outside the above-mentioned range, it suffices that it is possible to deform the shape in the second conductor moving step. Therefore, the shape of the temporary welded portion 20 is not limited to the one having a height-to-width ratio in the above-mentioned range.

In the embodiment described above, each of the temporary welded portion 20 and the welded portion 21 has a substantially rectangular shape when viewed in the longitudinal direction of the wires 1 (to be more precise, the shape of the space defined by the sonotrode 11, the grinding jaw 12, the anvil plate 13, and the anvil 14 has a substantially rectangular shape when viewed in the longitudinal direction of the wires 1). However, the shapes of the temporary welded portion 20 and the welded portion 21 are not limited to such a shape, and may be, for example, a triangular shape, a round shape, or a hexagonal shape when viewed in the longitudinal direction of the wires 1. Thus, the shapes, the relative arrangement, the number, and the like, of the sonotrode 11, the grinding jaw 12, the anvil plate 13, and the anvil 14 are merely illustrative, and not limited to the ones adopted in the embodiment described above. However, since it is necessary to change the relative positions of the conductors 2, the shape of the temporary welded portion 20 and the shape of the welded portion 21 are normally different from each other when viewed in the longitudinal direction of the wires 1.

The steps of the ultrasonic welding method described above are not necessarily performed sequentially.

In the embodiment described above, the upper surface (placement surface) of the sonotrode 11 and the lower surface of the anvil 14 have substantially planar shapes. However, in an actual apparatus, they are rarely formed as completely smooth surfaces. To be specific, in a normal case, for example, grooves extending in a direction orthogonal to the direction of vibration of the sonotrode 11 are formed in the upper surface of the sonotrode 11 and the lower surface of the anvil 14 so that no slip occurs relative to the conductors 2 during the ultrasonic vibration.

The invention claimed is:

1. An ultrasonic welding method of connecting conductors of a plurality of wires to one another, the conductors being exposed by partially removing insulating coatings from the plurality of wires, the method comprising:
a wire arranging step of arranging the plurality of wires in accordance with a predetermined arrangement;

a conductor moving step of pressing the conductors in a predetermined direction to thereby change relative positions of the conductors;

a first ultrasonic welding step of performing ultrasonic welding on the conductors in a state of being pressed in the predetermined direction;

a second conductor moving step of releasing the pressing of the conductors in the predetermined direction and then pressing the conductors in a different direction to thereby change the relative positions of the conductors resulting in re-positioning a first conductor between other conductors in such a manner that the first conductor and a second conductor that were not touching during the first ultrasonic welding step are touching after the second conductor moving step; and a second ultrasonic welding step of performing ultrasonic welding on the conductors in a state of being pressed in the different direction.

2. An ultrasonic welding method of connecting conductors of a plurality of wires to one another, the conductors being exposed by partially removing insulating coatings from the plurality of wires, the method comprising:

a wire arranging step of arranging the plurality of wires in accordance with a predetermined arrangement;

a conductor moving step of pressing exposed portions of the conductors in a predetermined direction to thereby change relative positions of the conductors;

a first ultrasonic welding step of performing ultrasonic welding on the conductors in a state of being pressed in the predetermined direction;

another conductor moving step of releasing the pressing of the exposed portions of the conductors in the predetermined direction and then pressing the exposed portions of the conductors in a different direction to thereby change the relative positions of the conductors resulting in a re-positioning of a first conductor between other conductors such that the first conductor and a second conductor that were not touching during the first ultrasonic welding step are touching after the another conductor moving step; and a second ultrasonic welding step of performing ultrasonic welding on the conductors after the another conductor moving step.

3. The ultrasonic welding method according to claim 2, wherein in the conductor moving step, relative positions of the insulating coatings of the plurality of wires are not changed.

4. The ultrasonic welding method according to claim 1, wherein as a result of the pressing of the conductors in the different direction, the conductors are arranged to be side by side in a direction orthogonal to a direction of the pressing of the conductors in the different direction.

5. The ultrasonic welding method according to claim 2, wherein, as a result of the pressing of the conductors in the different direction, the conductors are arranged to be side by side in a direction orthogonal to a direction of the pressing of the conductors in the different direction.

6. The ultrasonic welding method according to claim 1, wherein the conductors comprise a plurality of strands.

7. The ultrasonic welding method according to claim 2, wherein the conductors comprise a plurality of strands.

8. The ultrasonic welding method according to claim 1, wherein in the conductor moving step, relative positions of the insulating coatings of the plurality of wires are not changed.

* * * * *